Figure 1:
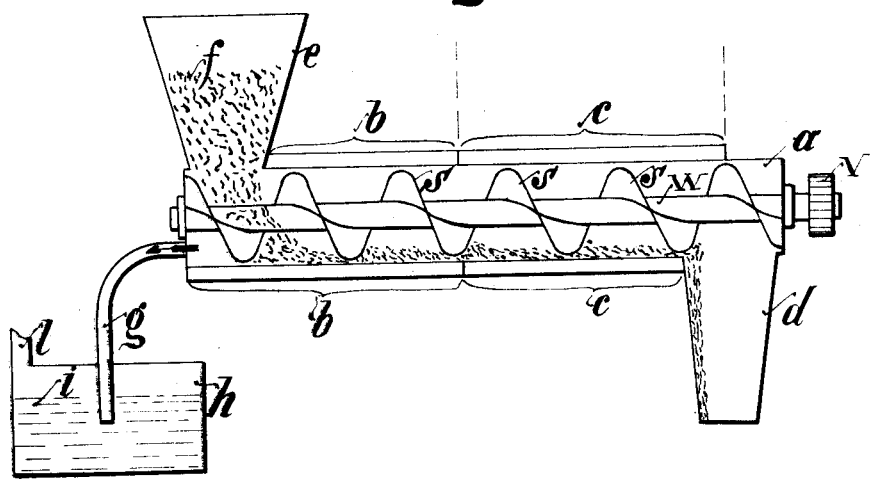

K. BURKHEISER.
METHOD OF CONVERTING AMMONIUM SULFITE INTO AMMONIUM SULFATE.
APPLICATION FILED MAY 18, 1911.

1,034,974.  Patented Aug. 6, 1912.

Witnesses
Katheryne Koch
Daniel Holmgren

Inventor
Karl Burkheiser
by Frank v. Briesen Atty.

UNITED STATES PATENT OFFICE.

KARL BURKHEISER, OF HAMBURG, GERMANY.

METHOD OF CONVERTING AMMONIUM SULFITE INTO AMMONIUM SULFATE.

1,034,974.   Specification of Letters Patent.   Patented Aug. 6, 1912.

Application filed May 18, 1911. Serial No. 627,914.

*To all whom it may concern:*

Be it known that I, KARL BURKHEISER, dipl. engineer, a subject of the German Emperor, and resident of 5 Ferdinandstrasse, Hamburg, Germany, have invented certain new and useful Improvements in Methods of Converting Ammonium Sulfite into Ammonium Sulfate, of which the following is a specification.

The same as sulfurous compounds in general if left exposed to the air or if submitted to the action of air will be transformed into sulfates, it is also known to convert sulfite of ammonium into sulfate of ammonium by bringing it into contact with the oxygen of the air. This conversion is generally effected by bringing the solution containing sulfite of ammonium into contact with air or by spreading the precipitated salt and conducting air over it. As numerous experiments have, however, shown it is by such means not possible to convert the whole of the sulfite into sulfate; in a surprisingly short space of time a state of permanency is reached between the freshly formed sulfate of ammonium and the sulfite of ammonium remaining unchanged, which state is not materially changed even if air be introduced into or conducted over the mixture for a considerable length of time. This state of permanency will regularly be reached, when about 60-65% of the sulfite of ammonium has been converted into sulfate, so that the mixture still contains 35-40% of unchanged sulfite. The conversion of the pure sulfite of ammonium into a mixture of about ⅔ of sulfate of ammonium and ⅓ of sulfite of ammonium proceeds extremely quickly and even unintendedly during the regular manufacture of sulfite of ammonium, the manufacture of an absolutely pure sulfite of ammonium being possible only under absolute exclusion of all free oxygen both during the manufacture and during the subsequent storage. It is therefore impossible to produce pure sulfite of ammonium by means of the customary process of manufacture; the product obtained will always consist of about ⅓ of sulfite of ammonium and ⅔ of sulfate of ammonium, the latter being formed even unintendedly during manufacture or storage if the access of air is not impeded. On the other hand this state of permanence between the sulfite of ammonium and the sulfate of ammonium will not change materially even if air is intendedly made to act on the mixture.

The present invention relates to a method of converting sulfite of ammonium completely into sulfate of ammonium. The new method consists in that the sulfate of ammonium freshly formed under action of the air is continuously separated during and after its formation from the sulfite remaining unconverted, the latter is again oxidized, again separated and so on until the whole of the sulfite is converted into sulfate. The separation by the new method may be obtained by utilizing the differing properties of the sulfite and the sulfate of ammonium or the property of the sulfite to sublimate at temperatures below 100° C.

In the following a method of operation together with an apparatus adapted for said method for this latter procedure will be described as an exemplification; the said apparatus admitting of a continuous service until the whole of the sulfite of ammonium has been converted into sulfate of ammonium.

In the accompanying drawing the apparatus is shown.

Figure 2:
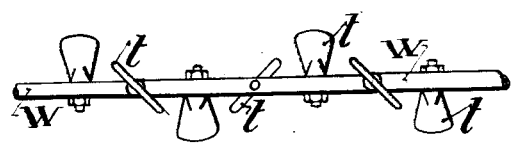
Figure 3:
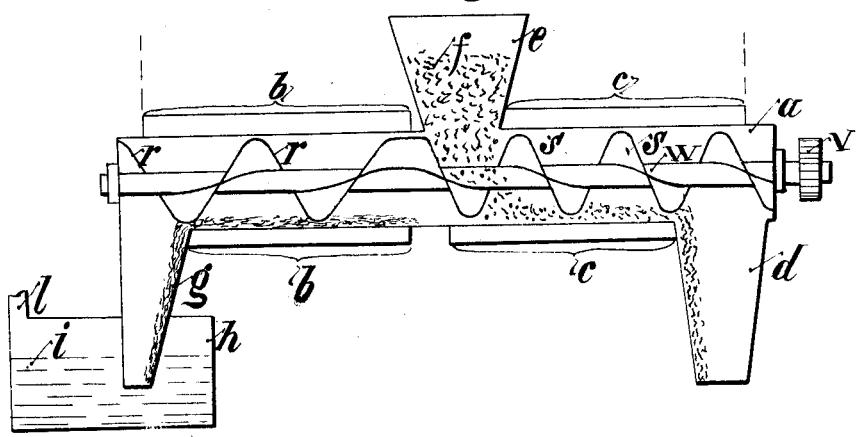

Figure 1 is a diagrammatic representation of the arrangement for conveying the charge by means of a worm conveyer to one side of the apparatus, the said arrangement being shown in a longitudinal section. Fig. 2 is a conveyer in which the worm is composed of single vanes fitted to a shaft. Fig. 3 is a conveyer with right- and left-handed worms.

The arrangement shown in Fig. 1 consists of a tube, which is surrounded along its front part, say to about one half of its length by a cooling jacket $b$, and along its rear part by a heating jacket $c$. Through the said cooling jacket $a$ a suitable cooling medium, say cold water, and through the heating jacket $c$ a suitable heating medium, such as steam is sent. In this way the part of the tubular body $a$ under the heating jacket is so heated that the sulfite of ammonium will be sublimated with certainty, whereas the part of the body $a$ surrounded by the cooling jacket is so cooled, that the vapors of sulfite of ammonium will be again condensed on its walls. In the center of the tubular body $a$ is rotatably journaled a worm conveyer $s$, the shaft of which $w$ is driven by means of a pulley $v$ in such a direction, that the worm s will convey the charge f from left to right, as seen in the drawing. At the left hand end, that is the coldest part of the tubular body a is arranged the funnel shaped hopper e for the introduction of the charge f, and at the right hand end of the tubular body a is provided below the fall or pit d. From the lower side of the front cooled part of the tubular body a a pipe g leads to a suitable depth into the liquid i of a container or tank h, from the top of which an air suction pipe l leads to a suitable suction apparatus, the liquid i consisting preferably of water.

The arrangement described operates in the following manner: The sulfite of ammonium or better the mixture of sulfite and sulfate of ammonium f is charged into the hopper e and is conveyed in thin layers by the worm conveyer s from left to right (as seen in the drawing) in the tubular body a. By the rotation of the worm s the particles of salt f will be continuously agitated and thereby be intensely exposed to the action of the current of air rushing in an opposite direction. The air required for the oxidization of the sulfite of ammonium is aspirated through the suction pipe l by means of a suitable suction apparatus; the air thereby rushes through the tubular body a from right to left (as seen in the drawing) and comes in an intimate contact with the layers of the charge f between the windings of the worm s, whereby the sulfite of ammonium introduced is converted as far as possible into sulfate of ammonium; the air then passes through the pipe g into the liquid i in the tank h, where it is washed, before it is drawn off through the suction pipe l. The sulfite of ammonium remained unconverted in the tubular body a is sublimated on the hot walls c; the thus formed sulfite vapors are carried by the current of air rushing through the body a to the left and will be again condensed on the cooled walls b as sulfite or as a mixture of sulfate and sulfite, whereupon they will be scraped off by the sharp edges of the worm conveyer s and again conveyed with the charge f introduced afresh to the right to be here again oxidized and separated, while such particles of the sulfite vapors or sulfite solution which are carried by the current of air through the pipe g will be retained in the liquid i in tank h to be subsequently treated and recovered. The charge which finally passes to the right and is discharged through the fall d consists of pure sulfate of ammonium only.

The constructional form shown in Fig. 1 is diagrammatic only; it is obvious that the tubular body and the worm s must be made of considerably longer dimensions so that the current of air is exposed to the oxidizing current of air as long as possible and on the other hand also the hot walls c and cold walls b respectively have sufficient time to act on the sulfite so as to completely sublimate it and so free the sulfate formed in the latter part of the tube a entirely of all sulfite, and respectively to give the sulfite vapors carried back by the current of air sufficient time to condense on the cold walls of the jacket b, so far as this should not yet have occurred on the cooler freshly supplied salt charge f. The worm conveyer shown in Fig. 2 differs from the conveyer according to Fig. 1 only by that single vanes or blades t are fitted to the shaft w in place of one continuous worm s.

While the arrangement according to Fig. 1 is intended to convert as far as possible the whole charge f introduced into the hopper e into sulfate of ammonium, whereby the at first not converted sulfite is sublimated on the hot walls c and subsequently condensed on the cooled walls b and is again and again brought together with the fresh charge f under action of the current of air, until the whole charge is converted into sulfate, the arrangement shown in Fig. 3 is intended to obtain a more rapid separation of the sulfate produced from the not converted sulfite. In this arrangement the hopper e is arranged about intermediately between the ends of the tubular body a. The worm conveyer has a right handed spiral s which will receive and convey the whole charge f from the hopper e, to the right, and a left handed spiral r which will only scrape the condensed sulfite from the cooled walls b and convey it to the wide mouth of the discharge pipe g. In this arrangement the part of the tubular body a to the left of the hopper e is surrounded by the cooling jacket b, and the part to the right by the heating jacket c, but the dimensions may be chosen in different manners according to requirement. So for instance the hopper e may be arranged farther to the left into the cooled part in which case of course the part of the conveyer conveying to the right should be accordingly lengthened so that it will receive the whole of the charge from the hopper e. The operation of this arrangement differs in so far from that of the arrangement according to Fig. 1, as here only the part of the charge is recovered which has been converted during one operation into sulfate of ammonium, while the sulfite sublimated on the hot walls, carried off by the current of air and taken to the left and here condensed on the cold walls b is conveyed into the tank h. Here the solution is further oxidized, as far as this should not have been effected by the current of air or the solution here obtained is again mixed with the mother lye obtained in the manufacture of the salt and further used.

The principle of the present invention consists in separating the sulfate of ammonium produced by the. as hereinbefore described, incomplete oxidization of the sulfite of ammonium from the not yet converted sulfite of ammonium and to again and again submit the latter to an oxidizing process, until the whole of the sulfite has been converted into sulfate. The arrangement according to Fig. 1 renders this principle fully attainable while the arrangement according to Fig. 3 realizes this principle in part only, as here a part of the non converted sulfite is returned into the tank $h$ and remixed with the mother lye.

I claim:

1. Method of converting ammonium sulfite into ammonium sulfate which consists in subjecting said sulfite to the action of oxygen, thereby oxidizing part of the ammonium sulfite to ammonium sulfate, separating the unconverted sulfite from the thus obtained sulfate, and again subjecting said unconverted ammonium sulfite to the action of oxygen to convert it into ammonium sulfate.

2. Method of converting ammonium sulfite into ammonium sulfate which consists in subjecting said sulfite to the action of oxygen, thereby oxidizing part of the ammonium sulfite to ammonium sulfate, separating the unconverted sulfite from the thus obtained sulfate, and repeatedly subjecting said unconverted ammonium sulfite to the action of oxygen until said residual sulfite is also converted into ammonium sulfate.

3. Method of converting ammonium sulfite into ammonium sulfate which consists in subjecting said sulfite to the action of an air current, thereby oxidizing part of the ammonium sulfite to ammonium sulfate, heating the mixture of said ammonium sulfate and residual ammonium sulfite to sublimate said sulfite, introducing said sublimated ammonium sulfite into the air current, cooling said current charged with the sublimated ammonium sulfite thereby condensing the latter, and resubjecting said condensed ammonium sulfite to the oxidizing action of the air current.

4. Method of converting ammonium sulfite into ammonium sulfate which consists in subjecting said sulfite to the action of an air current, thereby oxidizing part of the ammonium sulfite to ammonium sulfate, heating the mixture of said ammonium sulfate and residual ammonium sulfite to sublimate said sulfite while being subjected to the action of the air current to cause the latter to take along the sublimated ammonium sulfite, cooling the air current charged with said sublimated sulfite to condense the latter, and resubjecting said condensed ammonium sulfite to the oxidizing action of an air current.

In testimony whereof I hereto affix my signature in presence of two witnesses.

KARL BURKHEISER.

Witnesses:
WOLDEMAR HAUPT,
HENRY HASPER.